(12) United States Patent
Breuer et al.

(10) Patent No.: US 8,123,165 B2
(45) Date of Patent: Feb. 28, 2012

(54) PARTITION WALL WITH INTEGRATED CURTAIN RAIL FLAP

(75) Inventors: Matthias Breuer, Hamburg (DE); Andreas Neumann, Hamburg (DE); Michael Mosler, Hamburg (DE)

(73) Assignee: Airbus Operations GmbH (DE)

( * ) Notice: Subject to any disclaimer, the term of this patent is extended or adjusted under 35 U.S.C. 154(b) by 351 days.

(21) Appl. No.: 12/383,377

(22) Filed: Mar. 24, 2009

(65) Prior Publication Data

US 2009/0242149 A1   Oct. 1, 2009

Related U.S. Application Data

(60) Provisional application No. 61/072,447, filed on Mar. 31, 2008.

(30) Foreign Application Priority Data

Mar. 31, 2008   (DE) .......................... 10 2008 016 419

(51) Int. Cl.
*B64D 11/00*   (2006.01)

(52) U.S. Cl. ............................. 244/118.5; 52/29; 52/69

(58) Field of Classification Search ............... 244/118.5, 244/117 R; 296/24.4, 24.46, 24.43, 24.41; 52/64, 71, 238.1, 29, 32, 67, 69, 243.1; 49/323; 160/336, 335, 37, 210
See application file for complete search history.

(56) References Cited

U.S. PATENT DOCUMENTS

| 2,310,573 | A | | 2/1943 | Burton |
| 4,306,390 | A | * | 12/1981 | Brown .............................. 52/67 |
| 5,873,205 | A | * | 2/1999 | Hanlon et al. .................. 52/239 |
| 6,415,553 | B1 | * | 7/2002 | Krayer et al. .................. 52/36.1 |
| 6,523,779 | B1 | | 2/2003 | Michel |
| 7,530,529 | B2 | * | 5/2009 | Bock .......................... 244/118.5 |
| 7,703,718 | B2 | * | 4/2010 | Saint-Jalmes et al. ...... 244/118.6 |
| 2004/0003556 | A1 | * | 1/2004 | Zerbst .......................... 52/220.7 |
| 2006/0001302 | A1 | | 1/2006 | Achilles et al. |
| 2006/0277850 | A1 | * | 12/2006 | Gravel et al. .............. 52/204.51 |
| 2009/0242147 | A1 | * | 10/2009 | Breuer et al. .............. 160/323.1 |

FOREIGN PATENT DOCUMENTS

| DE | 10080841 | 5/2004 |
| DE | 102004017078 | 11/2005 |

* cited by examiner

*Primary Examiner* — Robert Canfield
*Assistant Examiner* — Jody Giacoman
(74) *Attorney, Agent, or Firm* — Lerner, David, Littenberg, Krumholz & Mentlik, LLP

(57) ABSTRACT

The invention relates to a partition wall for partitioning at least two regions in a cabin of a vehicle. The invention includes a partition comprising a body that may be moved into a first open position and into a second closed position and comprising a curtain rail, wherein the body is designed in the first position to cover an aisle that is adjacent to the partition, at least in some regions, by means of a curtain that has been affixed to the curtain rail.

20 Claims, 5 Drawing Sheets

PARTITION WALL WITH INTEGRATED CURTAIN RAIL FLAP

CROSS-REFERENCE TO RELATED APPLICATIONS

This application claims the benefit of the filing date of U.S. Provisional Patent Application No. 61/072,447 filed Mar. 31, 2008, the disclosure of which is hereby incorporated herein by reference.

The invention relates to a partition wall in a cabin of an aircraft.

BACKGROUND OF THE INVENTION

Such a partition wall (hereinafter also referred to as "partition") makes it possible in the cabin of an aircraft to provide light-proof and/or visually blocking separation between cabin regions of various classes, for example first class, business class or economy/tourist class. Partitions are often installed beneath hatracks or overhead stowage compartments (OHSCs). If partitions are to be provided in cabin regions in which no overhead stowage compartments are arranged, the partitions are installed between the cabin floor and the cabin ceiling. Such partitions, which extend along the entire height of the cabin, are not only positioned in the lateral regions but also in the centre region. Moreover, partitions are not only used to separate various classes from each other, but in addition they also serve as attachment/accommodation regions for monitors, baby bassinets, small stowage compartments (so-called dog houses) and the like.

Since within the cabin of an aircraft, parallel to the direction of flight, there are aisles for example between the central and the lateral seats, which aisles essentially extend along the entire cabin and thus also through class dividers, normally partition curtains for covering the aisles are used, which curtains, in their closed state, for example in each case extend between a lateral and a central partition and which are guided in curtain rails. In this arrangement, the available movement space, at least of the upper edge of a curtain, is limited to the length of the curtain rail. The curtain rails may additionally comprise trim elements that visually close off a free space towards the cabin ceiling that is situated above it. Such trim elements are also referred to as "header panels" or "curtain headers". Depending on customer requirements, at times curtain rails without trim elements may be used in an aircraft cabin. If the curtain is to remain open, it is usually gathered on one side by means of press- or snap-fasteners or by means of magnets, and is held at an adjacent partition.

SUMMARY OF THE INVENTION

This combination of partitions and curtain from the state of the art is associated with several disadvantages. For example, a gathered curtain is permanently visible, protrudes in an undesirable way into the space and is not aesthetically pleasing. Furthermore, a gathered curtain has to be stowed away in such a manner that in the case of an evacuation an emergency exit is not obstructed. Moreover, a curtain may cover up functional parts that depend on visibility, for example monitors for the in-flight entertainment (IFE) system, so that the aircrew will time and again have to settle for compromise solutions when stowing away the curtain. Furthermore, in the case of partitions, larger cabin systems (also referred to as "monuments") and the like, the required design space for the stowed-away curtain cannot be used for other purposes. Finally, the contour of the curtain rail trim presents an abrupt contrast to the ceiling contour, so that the class divider cannot be designed to provide a uniform appearance.

It may be the object of the invention to propose partitioning of a cabin of an aircraft, in which partitioning a curtain for an aisle in the cabin may be stowed away as completely as possible without compromising the emergency exit in the case of evacuation, without covering up any functional parts that depend on visibility, while nonetheless providing adequate design space for other uses, for example for baby bassinets.

This object may be met by a partition according to claim 1. Further advantageous embodiments are provided in the subclaims. The object may further be met by the usage of the partition according to the invention in an aircraft, as well as by an aircraft comprising the partition according to the further secondary independent claims.

In contrast to partitioning arrangements known from prior art, in the case of the partition according to the invention the curtain rail and its optional trim are integrated in a body that may be moved at least to a first position and to a second position, wherein a particularly preferred body is implemented as a flap. To this extent the partition according to the invention is designed so as to be relatively thick and so as to comprise a flap that may be hinged, on an axis arranged in the partition, towards the adjacent aisle, with the contour of said flap corresponding to the cabin ceiling contour and in its hinged-out state preferably conforming to the cabin ceiling. A curtain rail and, optionally, trim elements for filling the space between the cabin ceiling and the flap are integrated in the flap. The flap may preferably be hinged into the partition so that the flap and the partition in one of the two positions comprise an even, uninterrupted and uniform flush outer surface. In this arrangement the partition is preferably designed comprising a corresponding recess such that the curtain that extends in the curtain rail may be fully accommodated within the partition. Consequently, when the curtain is open, no emergency exits are obstructed in the case of an evacuation; in its open state the curtain does not obstruct visibility; and the entire partition according to the invention is fully available for other uses, for example for the integration of functional components or mounting parts that depend on visibility.

BRIEF DESCRIPTION OF THE DRAWINGS

Below, the invention is explained in more detail with reference to figures. In the figures the same reference characters are used for identical objects. The following are shown.

DETAILED DESCRIPTION

Figure 1:
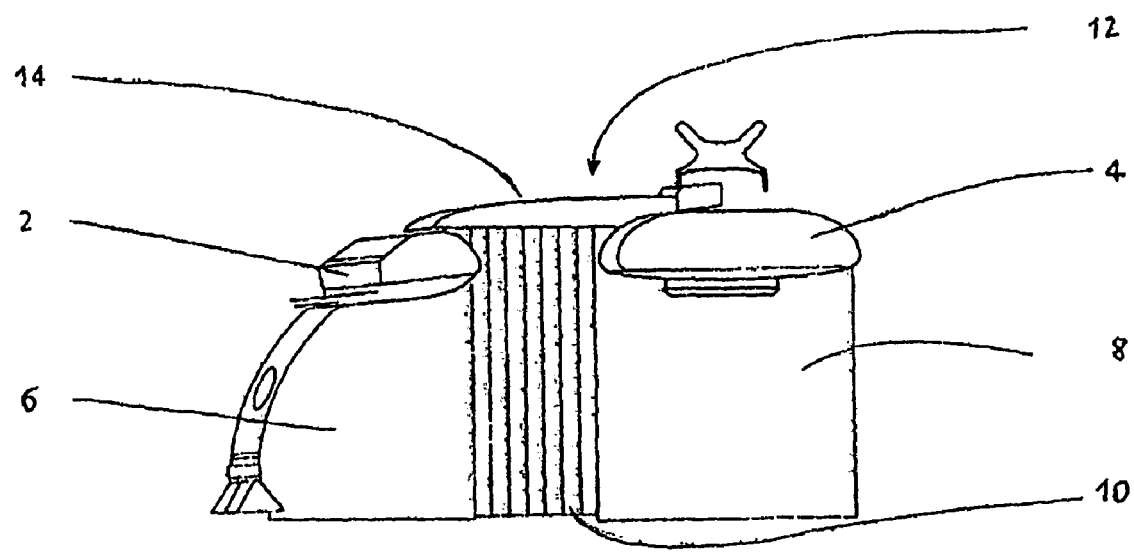
FIG. 1: partitioning from the state of the art.

The division between two classes in the cabin of an aircraft, which division is shown in FIG. 1, represents the general state of the art. The diagram only shows a section of the cabin cross-section with a left-hand hatrack 2, a centre hatrack 4, a lateral partition 6 and a centre partition 8. The partitions 6 and 8 are installed beneath the hatracks 2 and 4 and extend down to the floor of the cabin. Also possible are partitions that are installed directly underneath the ceiling and that extent down to the floor of the cabin. Finally, the lateral partition 6 extends from the left-hand cabin wall to an aisle in the cabin, which aisle is closed off by a curtain 10 and extends to the centre partition 8. Since time and again it is necessary to walk without hindrance along the aisle even in the region of a class divider, it must be possible to be able to correspondingly open the curtain 10 and to stow it away in a suitable manner. To this effect the upper edge of the curtain 10 is slidably held in a curtain rail 12, wherein the curtain rail comprises two trim panels 14 that extend parallel to the partitions 6 and 8. As seen from the aisle, these panels 14 extend in front of and behind the curtain rail 12; they are intended in particular to visually or in a light-proof manner block off the region between the curtain rail 12 and the cabin ceiling.

This widespread design is relatively unsatisfactory because the curtain 10 may cover up functional parts that depend on visibility, in its open state is visible in the space, and thus is not aesthetically pleasing. Furthermore, the design of the partitioning arrangement continues to be relatively non-uniform because the trim panels 14 of the curtain rail 12 clearly contrast with the partitions 6 and 8.

Figure 2:
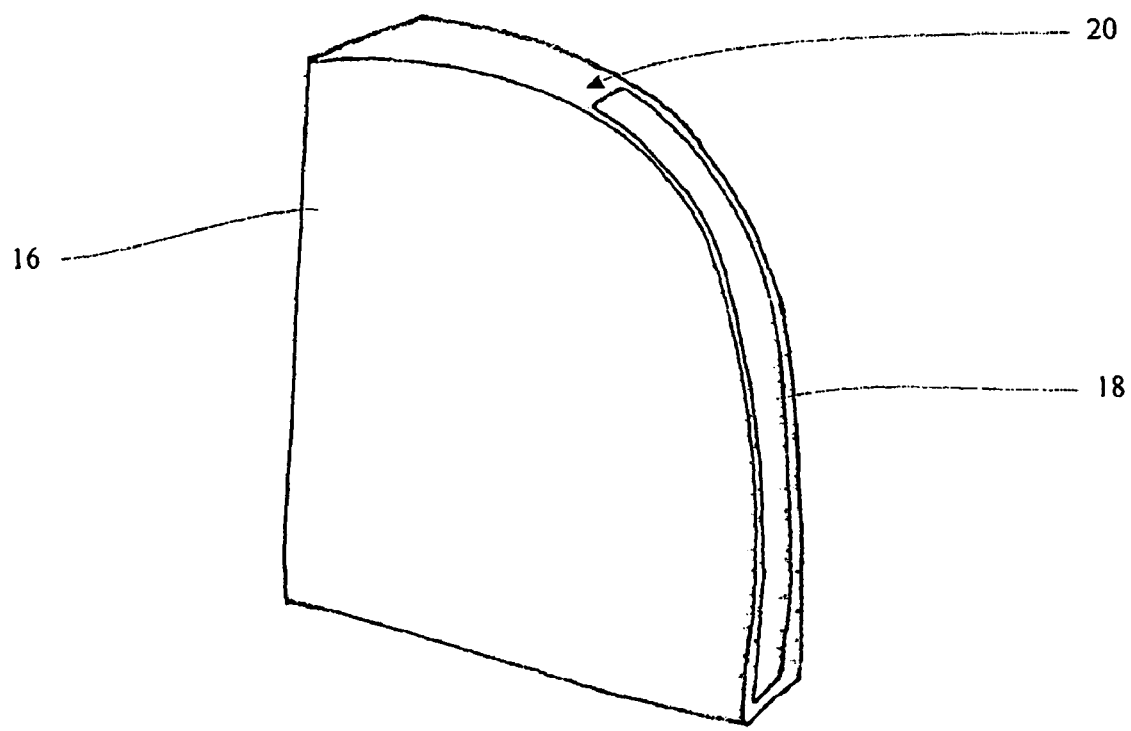
FIG. 2: a partition according to the invention.

In contrast to the above, the partition 16 according to the invention comprises a distinctly different design. First of all, the partition 16 according to the invention is designed so as to be relatively thick so that its extension in the longitudinal axis of the cabin of the aircraft is greater than that of a conventional partition 6. The special feature of the partition 16 according to the invention consists of the flap 18 being integrated in said partition 16, which flap 18 in its closed state, as shown in FIG. 2, forms a uniform surface with the partition 16. For example, the flap 18 is arranged in the partition 16 such that it is fully contained within the narrow lateral surface 20 that faces an aisle and the cabin ceiling. The width of the flap 18 is somewhat less than the width of the narrow lateral surface 20 of the partition 16. However, the width of the flap 18 may also correspond to the width of the partition 16, with the flap 18 resting against the contour of the partition 16.

Figure 3:
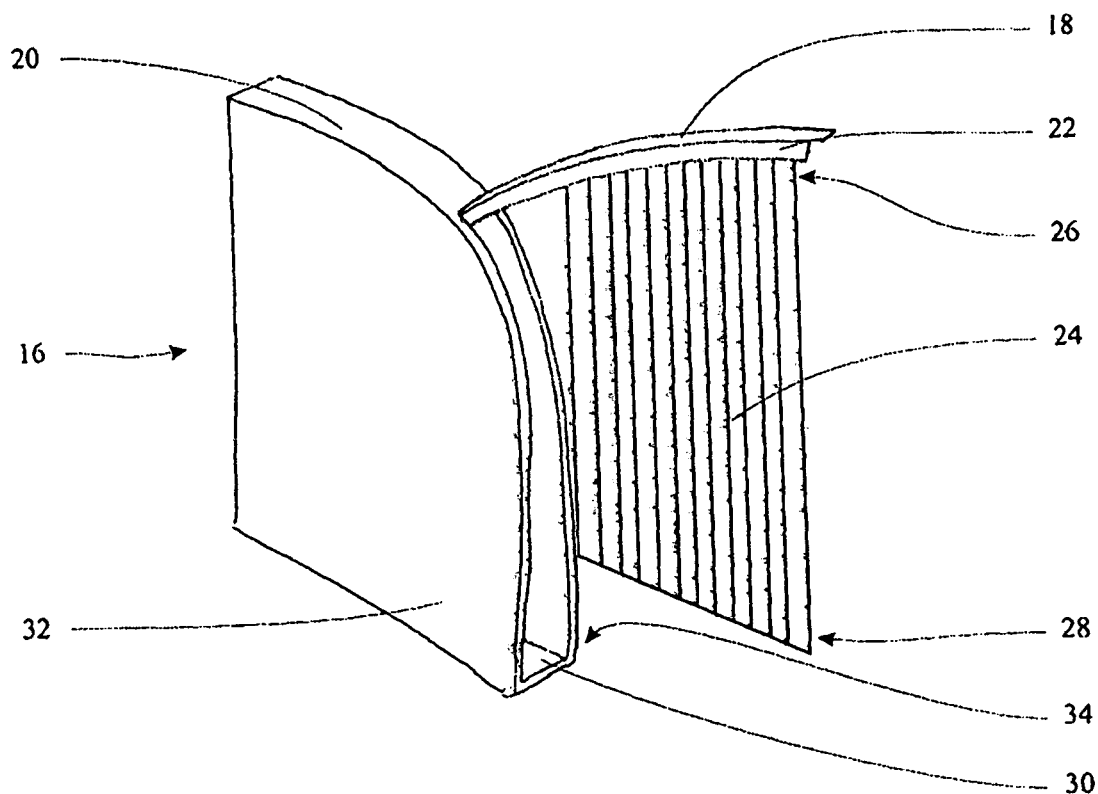
FIG. 3: a partition according to the invention, with the rail flap open.

FIG. 3 shows the partition 16 according to the invention, in which partition 16 the flap 18 is hinged out of the narrow lateral surface 20. The hinging movement preferably takes place on an axis that is not shown in the figure, which axis is located in the upper region of the partition 16. The flap 18 extends, for example, into a lower region of the partition 16 and may fully bridge an aisle that is adjacent to the partition 16. Likewise it is possible to design the length of the flap 18 such that only half the aisle is covered, while the other half is covered by a flap 18 in an opposite partition 16. For the purpose of sealing the space between the partition 16 and the cabin ceiling the flap 18 comprises a curved shape that essentially corresponds to the shape of the cabin ceiling. This requires that the partition 16, too, assumes a corresponding shape so that not only does this create a flush surface with the partition 16 when the flap 18 is closed, but in its open state the flap 18 also optimally conforms to the cabin ceiling.

Integrated in the flap 18 is a curtain rail 22 on which a curtain 24 is arranged. In a first exemplary embodiment the curtain rail 22 is curved and assumes the shape of the flap 18. The curtain 24 is thus preferably cut such that its upper edge 26 follows the curvature of the curtain rail 22, while, when the flap 18 is open, the lower edge 28 of the curtain 24 extends parallel to the cabin floor, thus essentially horizontally. When the flap 18 is open a recess 30 in the partition 16 becomes evident, with both the curtain 24 and the flap 18 being able to be arranged in said recess 30. Consequently the entire front surface 32 or rear surface 34 of the partition 16 may be used for purposes other than stowing away the curtain 24. Furthermore, the options for designing the exterior of the partition 16, the flap 18 and the curtain 24 are flexible to such an extent that the partitioning arrangement comprising the partition 16 according to the invention and the curtain 24 not only provides technical advantages but may also be designed so that it is aesthetically pleasing.

Figure 4:
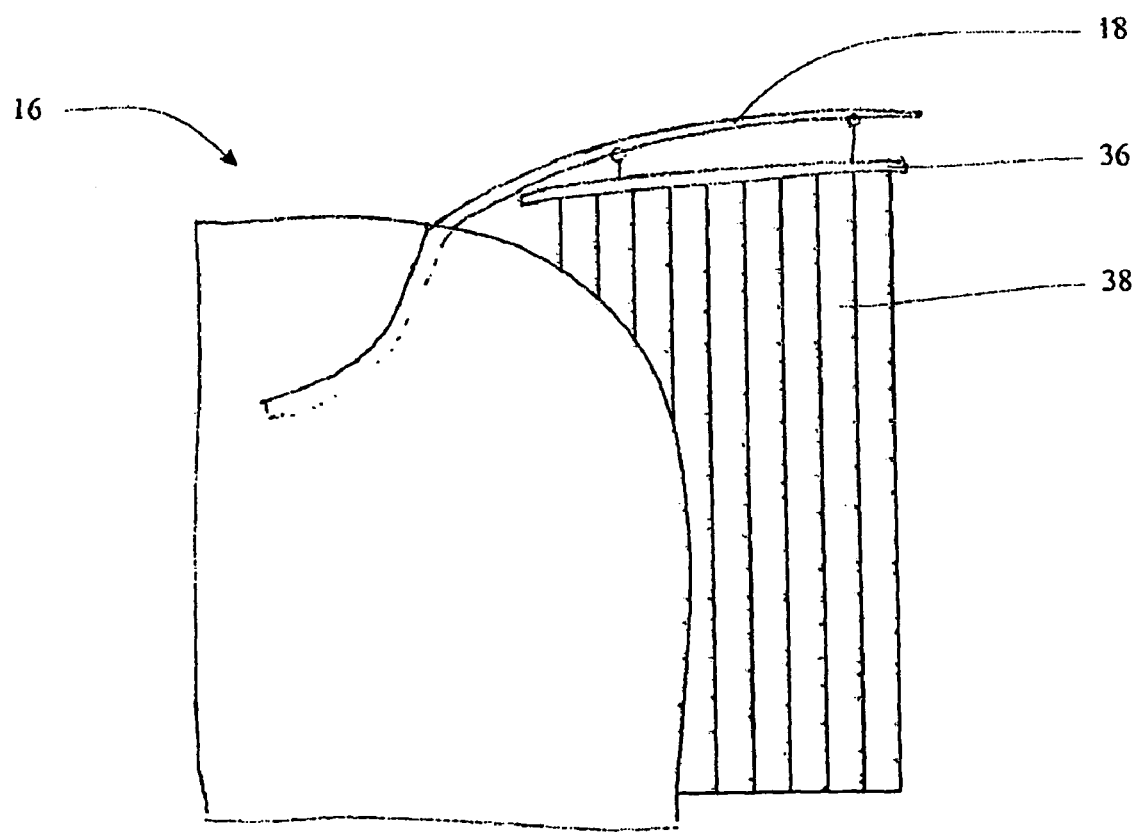
FIG. 4: a modification of a partition according to the invention, with the rail flap folded out.

FIG. 4 shows another variant of the partition 16 according to the invention in a second exemplary embodiment. In this embodiment the partition 16 also comprises a flap 18 to which a curtain rail 36 has been affixed, which in the folded-out state of the flap 18 extends essentially horizontally, essentially parallel to the cabin floor. However, it is also imaginable for the curtain rail 36 to be straight in shape and to encompass a particular angle to the cabin floor so that the curtain 38 may also be designed so as to be asymmetric.

In the exemplary embodiments of FIGS. 3 and 4 the flaps 18 share a common feature in that their shape corresponds with that of the cabin ceiling, so that in their hinged-out state said flaps 18 conform to the cabin ceiling. This results in the partition arrangement comprising the partition 16 and the curtain 24 or 38 reaching all the way from the cabin ceiling to the cabin floor. In addition, locking means may be arranged in the partition 16, in the flap 18 or in the cabin ceiling, which locking means make it possible to detachably affix said flap 18 in its hinged-out position so that secure holding of the curtain 24 or 38 is made possible.

The partition 16 according to the invention provides an advantage in that neither are there any obstructions, in the case of an evacuation, as a result of a gathered curtain, nor is there any visual obstruction of functional parts that depend on visibility. Lastly, a curtain that is not in use is not visible to passengers, because it may be completely stowed away within the partition 16. Overall, the cabin design is clearly enhanced as a result of transparency and unobstructed views.

Figure 5:
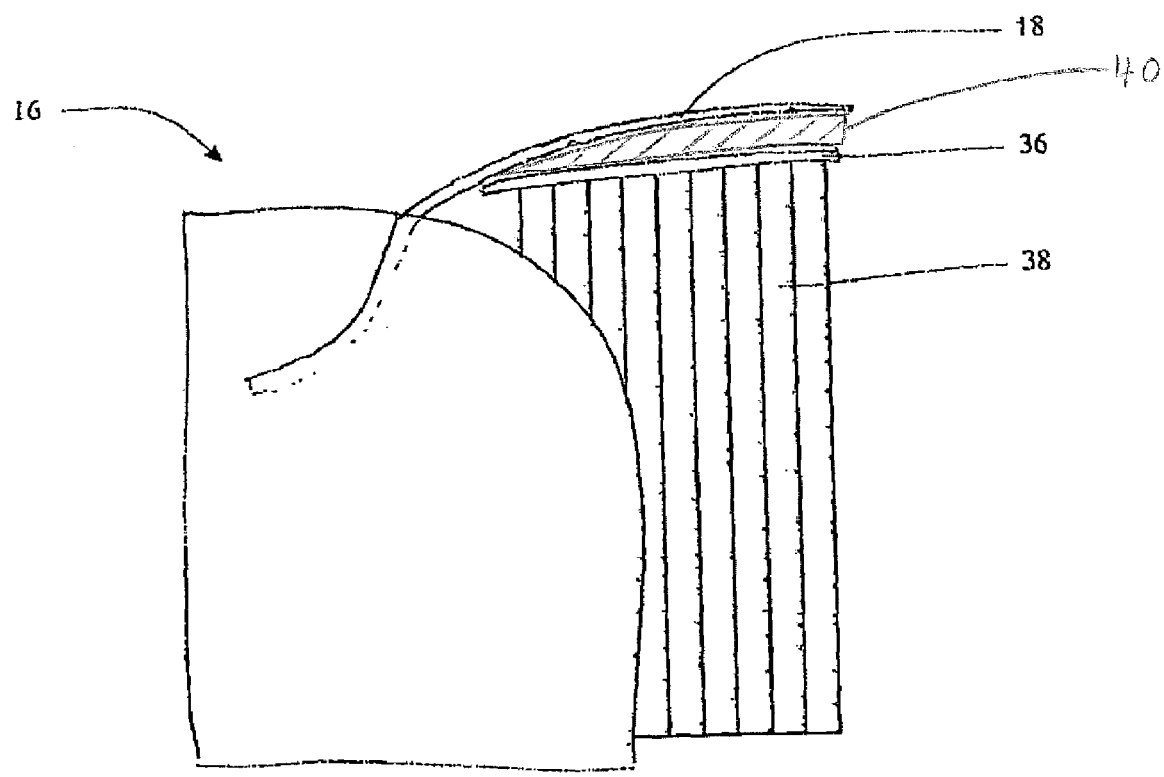
FIG. 5: a further modification of a partition according to the invention, with the rail flap folded out.

Further, FIG. 5 shows a modification of FIG. 4 where a trim element 40 is arranged between the curtain rail 36 and the flap 18 for covering the space between the flap 18 and the curtain rail 36.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Hatrack
4 Hatrack
6 Partition
8 Partition
10 Curtain (state of the art)
12 Curtain rail (state of the art)
14 Trim panel (trim element)
16 Partition with integrated curtain rail flap
18 Curtain rail flap
20 Lateral surface of the curtain rail flap
22 Curtain rail
24 Curtain
26 Upper edge of the curtain
28 Lower edge of the curtain
30 Recess in the partition with curtain rail flap
32 Front surface of the partition with curtain rail flap
34 Rear surface of the partition with curtain rail flap
36 Curtain rail
38 Curtain
40 Trim element

The invention claimed is:

1. A partition wall for partitioning at least two regions in a cabin of a vehicle, comprising:
   a partition wall and movably connected thereto a movably held body that can be moved into at least a closed position and an opened position and that comprises a curtain rail;
   wherein the body is designed in the opened position to cover an aisle that is adjacent to the partition wall, at least in some regions, by a curtain that has been affixed to the curtain rail,
   wherein the body is hingeably held on a hinging axis that is positioned within the partition wall,
   wherein the hinging axis is arranged such that the body in the open position is in proximity to a cabin ceiling, and
   wherein the partition wall further comprises at least one recess for accommodating the curtain when the body is in the closed position, which recess is covered by the body in the closed position.

2. The partition wall of claim 1,
   wherein the body has a curved shape that corresponds to the shape of the cabin ceiling so that the body in the open position essentially conforms to the cabin ceiling.

3. The partition wall of claim 1,
   wherein the curtain rail has a shape that corresponds to the shape of the body, wherein the curtain rail is positioned flush against the side of the body, which side in the open position is opposite the cabin ceiling.

4. The partition wall of claim 1,
   wherein the curtain rail is arranged at a distance from the body on the side of the body, which side in the open position is opposite the cabin ceiling.

5. The partition wall of claim 4,
   wherein the curtain rail comprises an essentially straight shape.

6. The partition wall of claim 4,
   wherein the body comprises trim elements for covering the space between the body and the curtain rail.

7. The partition wall of claim 1,
   wherein the body, when in a closed position, is arranged in a lateral surface of the partition wall, which lateral surface at least in some regions faces the aisle.

8. The partition wall of claim 1,
   wherein, the hinging axis is aligned so as to be essentially parallel to the longitudinal axis of the cabin.

9. The partition wall of claim 1,
   wherein at least one of the body or the partition wall comprises a locking device for locking the body in the first and/or the second position.

10. The partition wall of claim 1,
    wherein the partition wall and the body in the closed position form an even and flush common surface.

11. An aircraft comprising at least one partition wall according to claim 1.

12. A partition wall for partitioning at least two regions in a cabin of a vehicle, comprising:
    a partition wall and movably connected thereto a movably held body that can be moved into at least a closed position and an opened position and that comprises a curtain rail;
    wherein the body is designed in the opened position to cover an aisle that is adjacent to the partition wall, at least in some regions, by a curtain that has been affixed to the curtain rail,
    wherein the partition wall further comprises at least one recess for accommodating the curtain when the body is in the closed position, which recess is covered by the body in the closed position,
    wherein the body has a curved shape that corresponds to the shape of the cabin ceiling so that the body in the open position essentially conforms to a cabin ceiling.

13. The partition wall of claim 12,
    wherein the curtain rail is arranged at a distance from the body on the side of the body, which side in the open position is opposite the cabin ceiling.

14. The partition wall of claim 13,
    wherein the curtain rail comprises an essentially straight shape.

15. The partition wall of claim 13,
    wherein the body comprises trim elements for covering the space between the body and the curtain rail.

16. The partition wall of claim 12,
    wherein at least one of the body or the partition wall comprises a locking device for locking the body in the first and/or the second position.

17. The partition wall of claim 12,
    wherein the partition wall and the body in the closed position form an even and flush common surface.

18. A partition wall for partitioning at least two regions in a cabin of a vehicle, comprising:
    a partition wall and movably connected thereto a movably held body that can be moved into at least a closed position and an opened position and that comprises a curtain rail;
    wherein the body is designed in the opened position to cover an aisle that is adjacent to the partition wall, at least in some regions, by a curtain that has been affixed to the curtain rail,
    wherein the partition wall further comprises at least one recess for accommodating the curtain when the body is in the closed position, which recess is covered by the body in the closed position,
    wherein the curtain rail is arranged at a distance from the body on the side of the body, which side in the open position is opposite a cabin ceiling.

19. The partition wall of claim 18,
    wherein the curtain rail comprises an essentially straight shape.

20. The partition wall of claim 18,
    wherein the body comprises trim elements for covering the space between the body and the curtain rail.

* * * * *

UNITED STATES PATENT AND TRADEMARK OFFICE
CERTIFICATE OF CORRECTION

PATENT NO. : 8,123,165 B2  
APPLICATION NO. : 12/383377  
DATED : February 28, 2012  
INVENTOR(S) : Matthias Breuer et al.

Page 1 of 1

It is certified that error appears in the above-identified patent and that said Letters Patent is hereby corrected as shown below:

In the Specification

Col. 2, Line 4, delete "," after "of an aircraft".

Col. 2, Line 66, "extent" should read --extend--.

In the Claims

Col. 6, Line 14, "the cabin" should read --a cabin--.

Signed and Sealed this
Twenty-eighth Day of October, 2014

Michelle K. Lee
*Deputy Director of the United States Patent and Trademark Office*